(12) United States Patent
Reichert et al.

(10) Patent No.: US 7,633,256 B2
(45) Date of Patent: Dec. 15, 2009

(54) ENCODER ECCENTRICITY CORRECTION FOR MOTION CONTROL SYSTEMS

(75) Inventors: Brian Anthony Reichert, Lexington, KY (US); Steven Michael Turney, Lexington, KY (US); Danny Keith Chapman, Sadieville, KY (US); Thomas Austin Fields, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 774 days.

(21) Appl. No.: 11/121,576

(22) Filed: May 4, 2005

(65) Prior Publication Data

US 2006/0250104 A1 Nov. 9, 2006

(51) Int. Cl.
*G05B 19/29* (2006.01)
(52) U.S. Cl. ............... 318/602; 318/638; 318/651
(58) Field of Classification Search ............ 318/602, 318/638, 651
See application file for complete search history.

(56) References Cited

U.S. PATENT DOCUMENTS 6,304,825 B1  10/2001  Nowak et al.
7,245,103 B2 *  7/2007  Chapman et al. ............ 318/651

* cited by examiner

*Primary Examiner*—Bentsu Ro
*Assistant Examiner*—Erick Glass
(74) *Attorney, Agent, or Firm*—Coats and Bennett PLLC

(57) ABSTRACT

Correction of rotary encoder eccentricity in an image forming device having a motor controller using period and position pulse train feedback signals. A motor includes an encoder disc rotating with the motor and at least two encoder sensors disposed at different circumferential positions about the encoder disc. A controller may use a high speed clock to calculate a corrected speed count based on speed counts determined from the number of clock cycles that elapse per cycle of pulse trains from the encoders. The controller may also calculate a corrected position count based at least partly on one or more position counts determined from the number of clock cycles that elapse between periodic sampling points and transitions of encoder pulse trains. The corrected position count may also be calculated based on a position count and one or more speed counts.

27 Claims, 8 Drawing Sheets

ENCODER ECCENTRICITY CORRECTION FOR MOTION CONTROL SYSTEMS

BACKGROUND

The present invention relates generally to the field of motor control and specifically to improvement of speed and position or phase control. More specifically, the present invention relates to the correction of encoder eccentricities in motion control systems using encoder feedback to control motor speed and position.

Precise motor speed control is a requirement of a broad array of motor-driven applications. Mirror motors in laser print heads, disk drives, and CD-ROM drives are examples of devices requiring precise motor speed control. Another example where speed control is critical is a motor driving print media through an electrophotographic (EP) printer—in particular, a color EP printer—and/or driving the PC drum(s) of such a printer. Feature placement on the PC drum(s), and on the print media as it is transported past the drum(s), is directly influenced by the speed of the driving motor. Any perturbations in the speed of the drive motor may be manifested as image errors, such as banding or misregistration of dots on the print media. These errors are particularly noticeable in color EP printers, where different colors of toner are deposited in layers on the print media. To avoid these errors, dot placement must be tightly controlled. DC motors, and in particular, brushless DC motors are typically used in such applications. These motors are well suited to the speed and position control method of the present invention, although the invention is not so limited, and is applicable to AC motors as well.

Traditional motor speed control is accomplished with a Phase-Lock Loop (PLL) controller. Application of PLL controllers to motor control systems typically comprises generating a periodic signal representative of motor speed—such as from an encoder or frequency generator—and comparing the signal to a reference signal of a desired frequency. The PLL controller attempts to match the phase, and hence frequency, of the two signals. Based on the phase error signal from the PLL controller, the voltage to the motor is increased or decreased to increase or retard its speed, so as to match the reference signal.

PLL controllers are effective in many applications, but have some limitations, particularly when motor systems are subjected to varying loads and varying speeds. Unlike oscillating electrical signals, motors and the objects they displace are inertial bodies and do not respond instantaneously to changes in commanded signals. Because of this, PLL-based motor controllers, while adequate for the speed control of motor systems that are characterized by a constant and predictable load, do not compensate well for fluctuations in mechanical load, such as commonly found in EP printers. Torque fluctuations in EP printers may arise due to paper picking, nip shock, toner stirring, and a variety of other causes.

Additionally, traditional PLL controllers are constructed using analog circuits, which include many non-linear components. Furthermore, most PLL controllers are "tuned" for a specific range of frequencies, outside of which the control seriously degrades. Even within the designed frequency range, however, due to the control of both frequency and phase, with PLL controllers it is important to know which error—phase or frequency—dominates, as controlling to the wrong error may cause the motor speed to lock onto harmonics of a commanded speed rather than the actual commanded speed.

Other motor controllers incorporate digital solutions, such as a digital PID controller, which permits implementation in ASICs or DSPs, to control the speed and position of a motor shaft subjected to varying speeds and loads. Some versions of the digital motor controllers utilize an encoder, tachometer, or other periodic signal generator from which motion feedback quantities are generated. Two exemplary motion feedback quantities include a speed count and a position count, each of which may be generated from the encoder signal. The speed count is typically determined as the number of high frequency clock cycles that elapse per encoder cycle. Thus, the speed count provides an indication of the time that elapses during one encoder period with larger speed counts reflecting lower motor speeds and vice-versa. By comparison, the position count provides an indication of a phase shift in the encoder signal and may be determined as the number of high frequency clock cycles that elapse between a periodic command pulse and a subsequent rising or falling edge of an encoder cycle. Stated another way, the position count provides an indication of the phase of the encoder signal relative to a predetermined reference. Motion feedback quantities such as these two counts are independently determined and fed back to the digital motor controller, which adjusts the motor speed, typically by adjusting the duty cycle of a pulse-width-modulated drive signal, to correct any speed and position errors indicated by the motion feedback quantities. One example of a motor controller using this type of speed and position correction is disclosed in commonly assigned U.S. patent application Ser. No. 10/378430, filed Mar. 3, 2003, which is hereby incorporated by reference herein, in its entirety.

Incremental optical encoders used to generate these motion feedback quantities provide a series of periodic signals set off by mechanical motion. The number of successive periods corresponds to resolvable mechanical increments of motion. In the case of rotary encoders, which are typically coupled to a rotating motor or drivetrain shaft, each cycle of the periodic signal produced by the encoder corresponds to some angular displacement of an encoder wheel. The encoder signal provides alternating logic states of "0" and "1" for each successive cycle of resolution. Rotary optical encoders achieve angular counting through a light emitter-receiver pair where light either passes though spaced apart apertures in the encoder wheel or reflects off spaced apart reflective segments on the encoder wheel. Where rotating encoders are used to generate these discrete motion feedback quantities, encoder eccentricity may result if the optical center of the encoder wheel is not aligned with the center of rotation of the shaft on which the encoder wheel is mounted. This eccentricity may produce apparent speed and/or position errors that are interpreted by the motor controller as actual errors. Consequently, the motor controller will try to compensate for these apparent errors by changing the speed of the motor, even where no changes are actually required.

SUMMARY

Embodiments of the present invention are related to a method and apparatus for correcting encoder eccentricity in an image forming device that uses encoder feedback signals to generate speed and position counts to control the speed and motor shaft position of a rotary motor. The motor may be used to drive a document transport roller or some other imaging unit component such as a photoconductive drum in the imaging device. The motor may have an encoder disc coupled thereto (directly or to a gear train shaft) so that the encoder disc rotates in conjunction with the motor. A first encoder sensor is positioned at a first circumferential location about the encoder disc. A second encoder sensor is positioned at a second, different circumferential location about the encoder disc. The first encoder sensor and the second encoder sensor may be located substantially 180 encoder disc degrees apart from one another. Each encoder sensor generates a pulse train indicative of the speed of the motor. A controller may use a high speed clock to calculate a corrected speed count from an average of a number of clock cycles that elapse per cycle of the pulse trains from the first and second sensors.

The controller may also generate periodic sampling points and calculate a corrected position count from a number of clock cycles that elapse between a sampling point and a transition of the pulse train from the first encoder sensor. In one embodiment, the controller may generate a second set of sampling points and calculate the corrected position count as an average of position counts for each encoder sensor determined as the number of clock cycles that elapse between a sampling point and a transition of the pulse train for the respective encoder sensors. In one embodiment, a corrected position count may be determined from one or more speed counts and/or a corrected speed count. In one embodiment, a third encoder sensor may be positioned at a third circumferential location about the encoder disc. The third encoder sensor may be positioned so that the phase of a speed count determined from this third encoder sensor is substantially the same as the phase of a position count determined from one of the other encoder sensors. The controller may calculate the corrected position count based on a number of clock cycles that elapse per cycle of the first, second, and third pulse trains.

DETAILED DESCRIPTION

Figure 1:
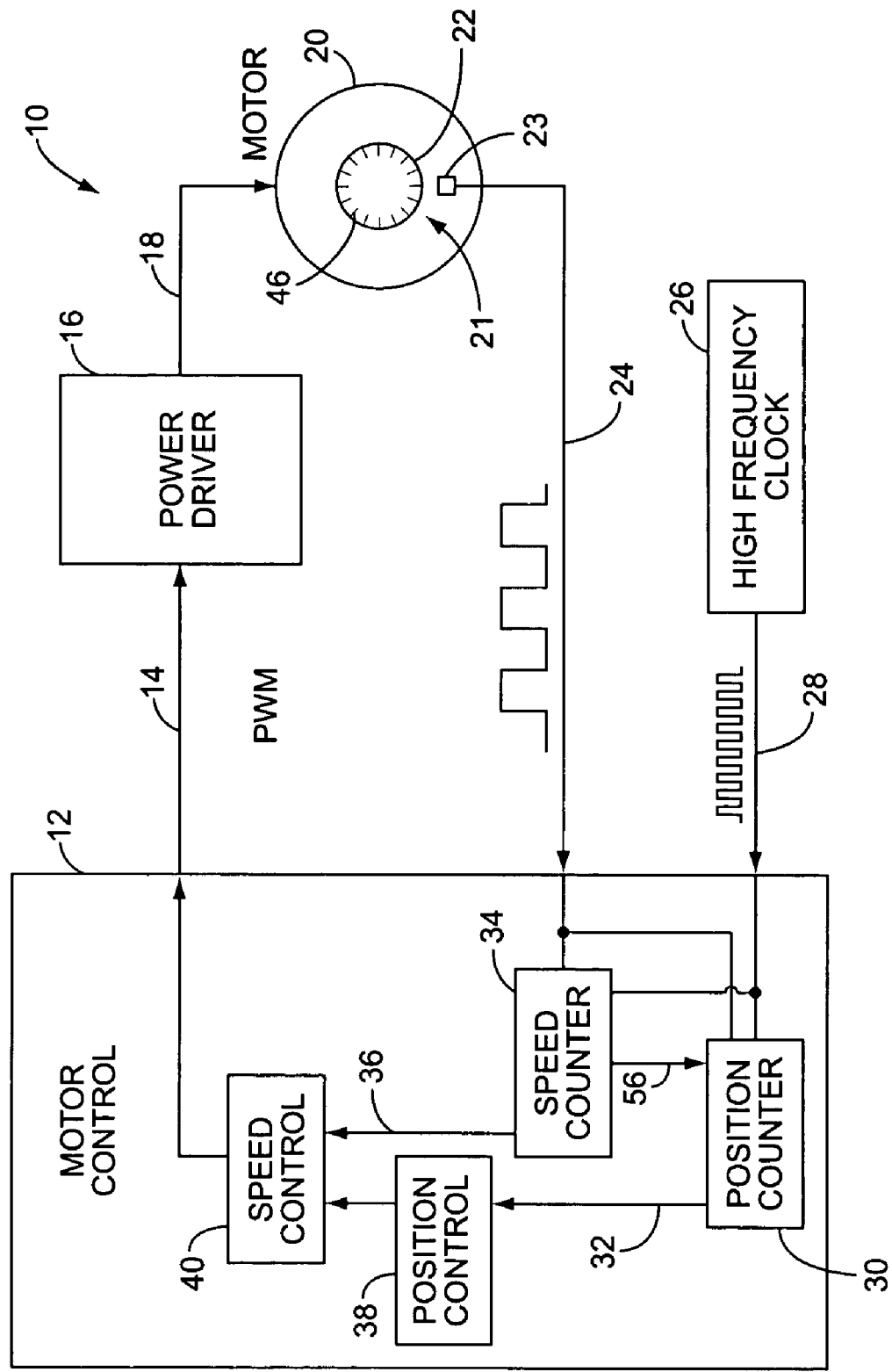
FIG. 1 is a schematic illustration of a motor control circuit according to one embodiment of the present invention.

Embodiments of the present invention are directed to the correction of motor eccentricity in systems using encoder feedback to control motor speed and motor shaft position. FIG. 1 depicts a high-level representation of an exemplary motor control system, designated generally by the number 10, in which embodiments of the present invention may be implemented. The motor control system 10 includes a motor controller 12 that generates a Pulse Width Modulated (PWM) motor drive signal 14. A power driver 16 converts the PWM data to power signals 18 that are applied to the motor 20, as is well known in the art. Operatively coupled to the motor 20 is a rotary position encoder 21, which comprises an encoder wheel 22 that rotates in conjunction with the motor 20. In one embodiment, the encoder wheel 22 is coupled to a rotating shaft of motor 20. Alternatively, the encoder wheel 22 may be indirectly coupled to the motor 20, such as on a gear shaft or other drive train shaft (not shown), so that the encoder wheel 22 rotates in conjunction with the motor 20. In one embodiment, the encoder wheel 22 may be mounted to rotate in conjunction with a photoconductive unit in an image forming device. Thus, since it is not expressly required that the encoder wheel 22 to be mounted directly to a motor 20, the motor 20 may be a rotary or linear motor. Other motion inducing actuators may also be used in lieu of a motor 20.

The encoder wheel 22 may be an optical encoder having spaced apart apertures or spaced apart reflective segments 46 that are detectable by one or more encoder sensors 23 that are disposed about the circumference of the encoder wheel 22. For example, in the embodiment shown in FIG. 2, three encoder sensors 23a, 23b, 23c may be positioned about the circumference of the encoder wheel 22. More or fewer encoders may be used as appropriate. For example, embodiments described below use different numbers of encoders 23. Referring still to FIG. 1, encoder sensors 23 generate an encoder signal 24 comprising a pulse train that provides alternating logic states of "0" and "1" for each successive cycle of encoder wheel 22 resolution. That is, each cycle of the periodic signal 24 produced by the encoder sensor 23 corresponds to some angular displacement of an encoder wheel 22. In one embodiment, an encoder wheel 22 having 720 encoder lines per revolution may be used.

Accordingly, the encoder sensor 23 generates a pulse train 24 indicative of the speed and incremental position of the motor 20. The pulse train output 24 is used by the controller 12 to calculate speed and position errors of the motor 20 shaft as compared to a desired shaft motion. A high frequency clock 26 generates a high frequency, periodic clock signal 28 that is supplied to the motor controller 12. The speed and position of the motor 20 are determined from the pulse train 24 by use of the clock signal 28. As a functional lower limit on the frequency of the clock signal 28, it must satisfy the Nyquist criteria, i.e., that it is at least twice the frequency of the highest frequency component of the pulse train 24. The clock signal 28 is preferably an order of magnitude or more faster than the pulse train 24, and is most preferably several orders of magnitude faster. For example, in one embodiment, the clock signal 28 has a frequency of about 16 MHz, and the pulse train 24 has a frequency of about 1 KHz. However, it should be understood that the frequency of the pulse train 24 varies according to motor speed.

The exemplary motor controller 12 comprises a position counter 30, a speed counter 34, a position controller 38, and a speed controller 40. While these components are shown as separate entities, it should be understood that FIG. 1 is a functional representation; in a given implementation, the motor controller 12, the high frequency clock 26, the counters 30, 34, the controllers 38, 40, and possibly the power driver 16 may be combined, such as in an ASIC, FPGA, DSP, or the like, as is well known in the art. Accordingly, signals 23, 36, and 56 may be more appropriately represented as discrete quantities that are continually updated. Those skilled in the art will comprehend the changes that are warranted for specific hardware or software applications.

The exemplary motor controller 12 establishes a dominant control loop (the course control loop) via speed controller 40 to effect speed control. The purpose of the speed control loop is to ensure that the speed of the motor 20 is correct. The motor controller 12 additionally implements a secondary control loop (the fine control loop) via position controller 38 to effect position control. The purpose of the position adjustment loop is to remove position errors, which manifest themselves as misalignments of the motor 20 shaft. The position adjustment loop removes position errors by commanding small motor speed adjustments in the speed control loop. In one embodiment, both the speed control loop and the position adjustment loop include a Proportional, Integral, Derivative (PID) controller, which are well known in the control system arts. The exemplary embodiment of the motor 20 and motor controller 12 may be used in an image forming device, such as a color printer, where the motor 20 drives an object, such as print media or a photoconductive drum, at a constant speed. The motor controller 12 manages speed and position errors, which, if uncorrected, may result in erroneous operation, such as, for example, the misregistration of color pixels on the print media or banding effects.

The speed counter 34 determines the speed of the motor 20 by counting the number of cycles of the clock signal 28 that occur per cycle of the pulse train 24. For example, the speed counter 34 may count the number of cycles, or "ticks," of the clock signal 28 that elapse between transitions of the pulse train 24. FIG. 3 graphically depicts this pulse counting technique for three separate pulse trains 24a, 24b, 24c, which may be generated by the encoder sensors 23a, 23b, 23c shown in FIG. 2. Using one cycle of each pulse train 24a, 24b, 24c, and sampling on the rising edges, the number of cycles, or ticks, of the clock signal 28 are counted to produce respective speed counts T1, T2, T3. Considering for the moment a single encoder system as shown in FIG. 1, a sequence of speed count values T1 may be transmitted as a speed count signal 36 to speed controller 40, and by comparison to a predetermined desired number of ticks per cycle, the PWM data 14 output by the motor controller 12 may be adjusted to advance or retard the speed of the motor 20, as required to bring the two counts into agreement.

In one embodiment, the speed counter 34 may count the number of clock cycles that elapse between adjacent rising edges of the pulse train 24. In one embodiment, the speed counter 34 may count the number of clock cycles that elapse between adjacent falling edges of the pulse train 24. Other possibilities may be used, including, for example, counting between multiple cycles or between rising and falling edges of the pulse train 24.

The speed count signal 36 provides an indication of the rotor speed of the motor 20. That is, the more clock signal 28 ticks that are counted during one cycle of the pulse train 24, the slower the motor is turning. Conversely, the fewer clock signal 28 ticks that are counted per cycle of the pulse train 24, the faster the motor 20 is turning. By comparing the actual number of clock signal 28 ticks counted during a cycle of the pulse train 24 to a predetermined, desired number to be counted, a speed error may be computed. In other words, the rising edges of the pulse train 24 may be used as a sampling signal, indicating when the speed counter 34 is to sample and count elapsed cycles of the clock signal 28. As the frequency of the clock signal 28 is known and highly precise, the speed of the motor 20 may be determined.

Figure 4:
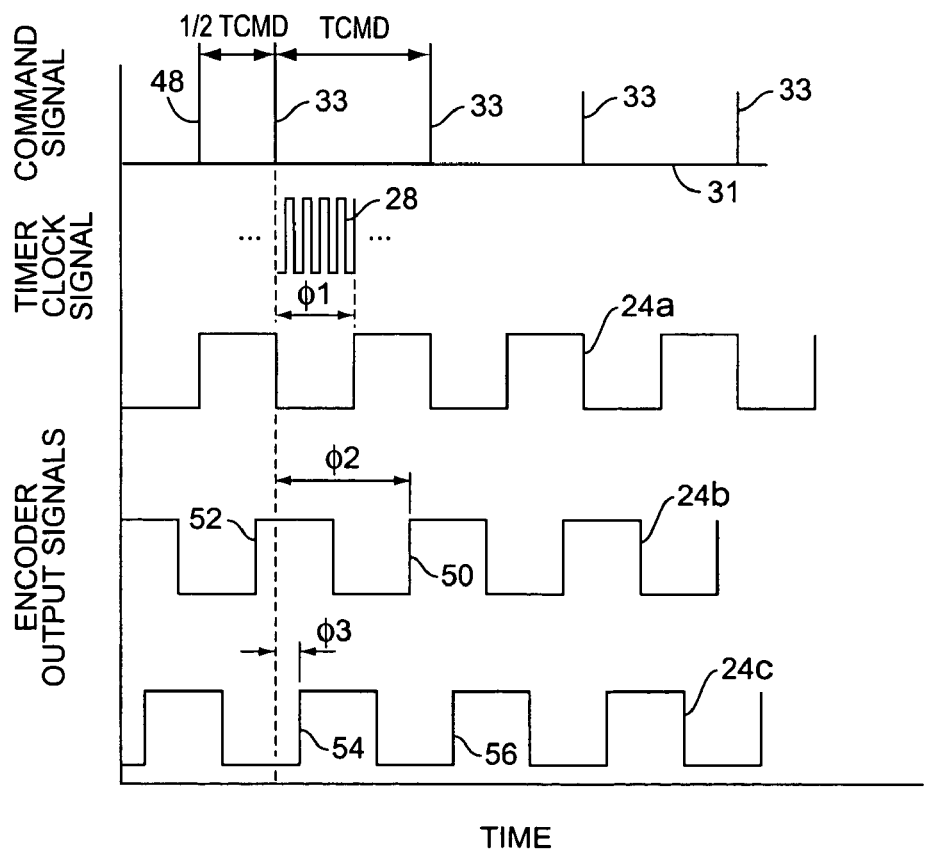
FIG. 4 is a timing diagram showing multiple encoder pulse trains and a command signal according to one embodiment of the present invention.

The exemplary motor controller 12 further controls the position of the motor 20. Speed is controlled by ensuring that the pulse train 24 cycles at a constant, predetermined rate. Position is controlled by forcing the pulses to transition at specific, predetermined points in time. The position counter 30, under the control of the motor controller 12, generates a command position signal 31 that comprising a series of precisely, temporally-spaced impulses, or sampling points 33 as shown in FIG. 4. The command position signal 31 is shown as a series of pulses 33, but may also comprise a binary signal or other sampling point signal, with sample points coinciding with rising, falling or alternating edges. FIG. 4 graphically depicts this position counting technique for three separate pulse trains 24a, 24b, 24c, which may be generated by the encoder sensors 23a, 23b, 23c shown in FIG. 2. Each time the sampling pulse 33 triggers, the position counter 30 counts the number of cycles, or ticks, of the clock signal 28 that occur between the sample point and the next rising edge of the pulse trains 24a, 24b, 24c. Alternatively, the count may be determined between the sample point and the next falling edge of the pulse trains 24a, 24b, 24c. For either case, a position count $\Phi 1$, $\Phi 2$, $\Phi 3$ may be generated for each pulse train 24a, 24b, 24c. Considering again the single encoder example shown in FIG. 1, a position controller 38 compares the position count $\Phi 1$, transmitted as a position count signal 32, to a predetermined value, and directs the speed controller 40 to adjust the speed of the motor 20 as needed. The speed adjustments attempt to force the position count $\Phi 1$ and the predetermined value to coincide from sample to sample, thus ensuring a constant position. Note that the speed controller 40 adjusts the speed of motor 20 based on speed count T1 and position count $\Phi 1$ information.

Figure 2:
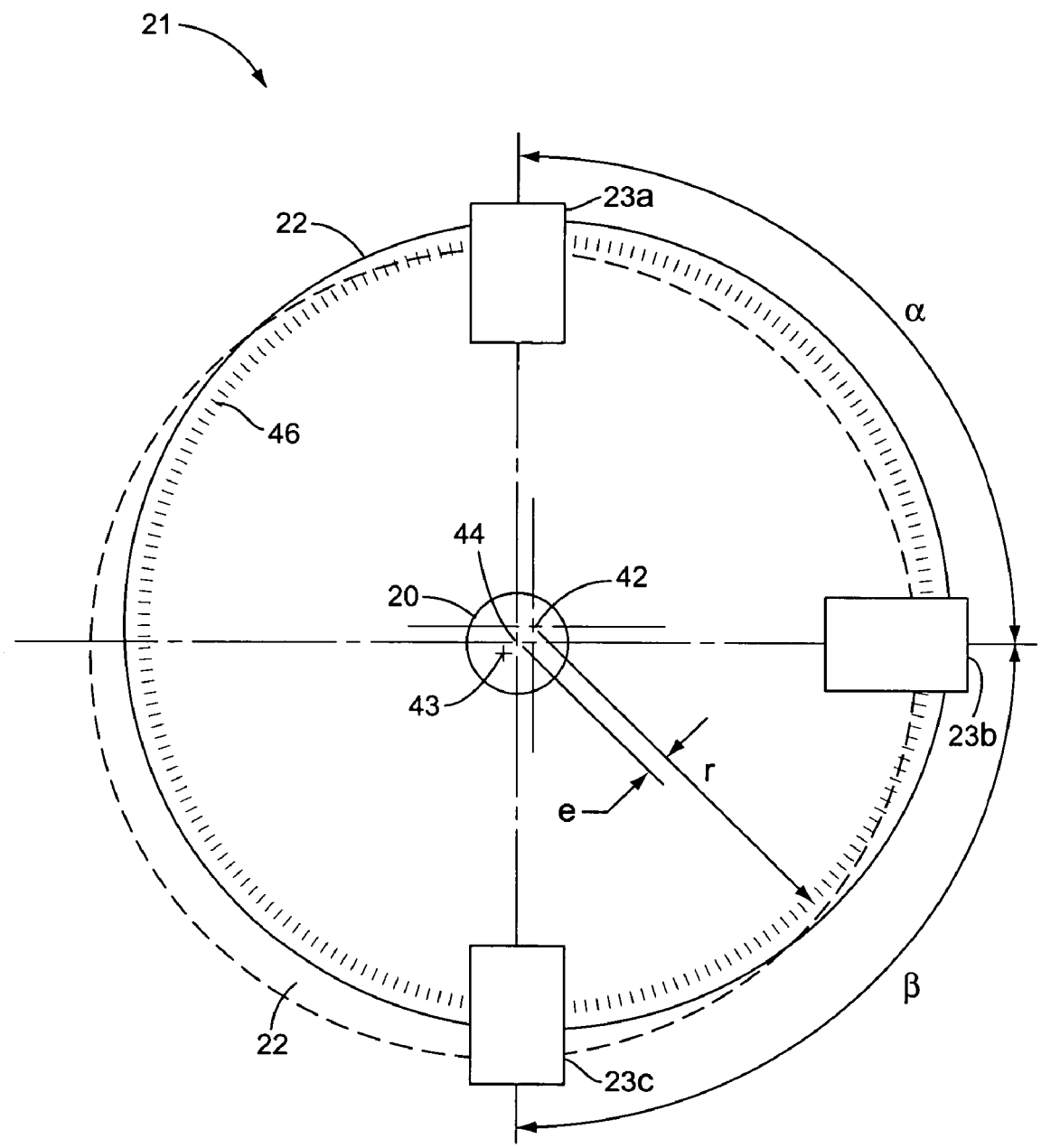
FIG. 2 is a schematic illustration of a rotary encoder with multiple encoder sensors disposed about the encoder wheel according to one embodiment of the present invention.
Figure 3:
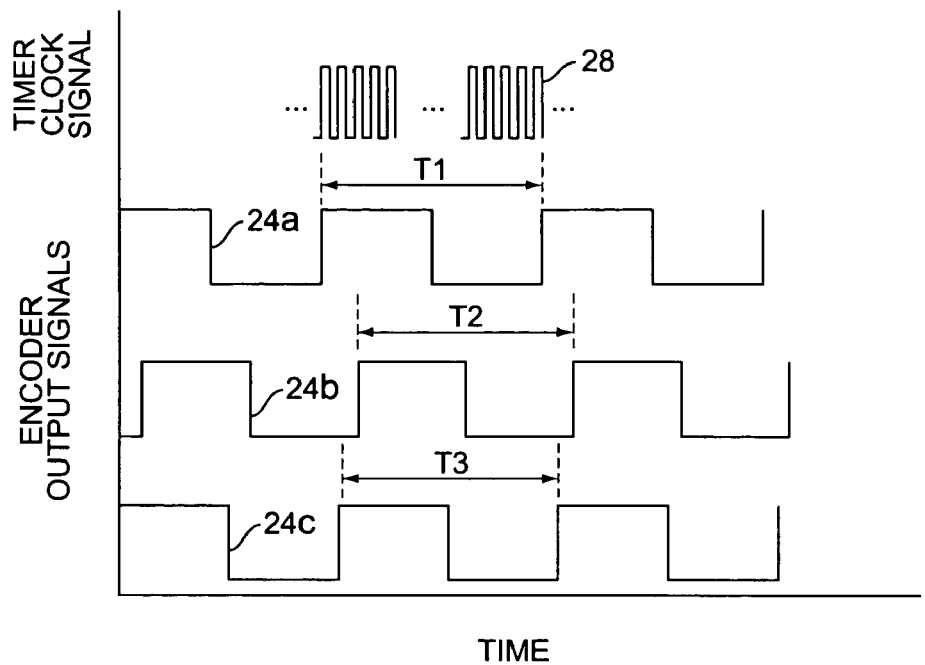
FIG. 3 is a timing diagram showing multiple encoder pulse trains and a high speed clock signal according to one embodiment of the present invention.

Referring to FIG. 2, the various embodiments disclosed below use multiple encoder sensors, such as sensors 23a, 23b, 23c, disposed about an encoder wheel 22 to correct errors induced by eccentricity. It is usually the case that there is some amount of eccentricity between the encoder disc 22 and the motor 20. The sensors 23a, 23b, 23c may be aligned with the motor 20 or encoder disc 22. In the example shown in FIG. 2, the sensors 23a, 23b, 23c are aligned with a shaft of motor 20, the axis of which represents the center of rotation 44. However, the encoder disc 22 and/or the sensed features 46 on the encoder disc 22 are not perfectly centered about the center of rotation 44. In FIG. 2, this eccentricity is shown as dimension e, which represents the offset between the rotational center 44 of motor 20 (e.g., axis of motor shaft, motor rotor, or other rotating component) and the optical center 42 of the encoder disc 22. A result of this eccentricity is that, even at a constant motor speed, the individual encoder segments 46 (e.g., reflective lines or apertures) follow different rotational paths about the center of rotation 44. The encoder disc 22 may also whirl about the center of rotation 44. This effect is shown by the dashed representation of the encoder disc 22, which shows the position of the disc 22 when the motor 20 and disc 22 have rotated approximately 180 degrees from the solid representation. In this dashed representation, the optical center 42 has traveled around the center of rotation 44 to a new position 43. Meanwhile, to the fixed encoder sensors 23a, 23b, 23c, it appears that the encoder disc 22 and motor 20 are speeding up and slowing down through each revolution of the encoder disc 22. This "apparent" change in velocity occurs because the instantaneous radius from the rotation center 44 to the encoder segments 46 continually changes even though the actual radius r from the optical center to the encoder lines is constant.

Figure 5:
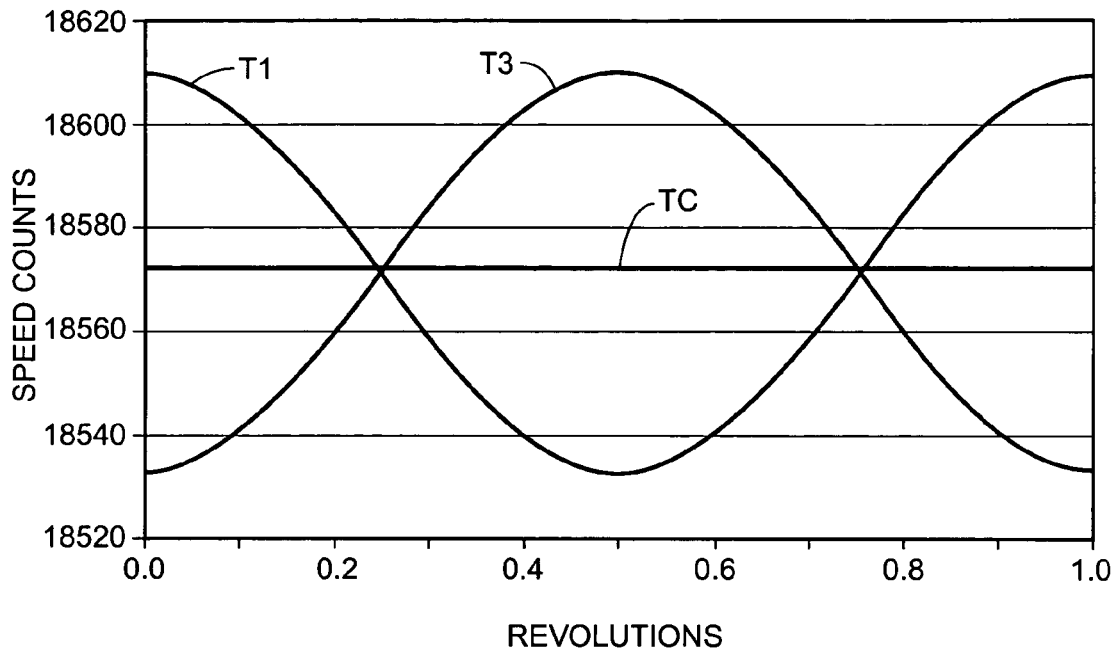
FIG. 5 is a signal diagram showing speed counts and a corrected speed count for an eccentric encoder according to one embodiment of the present invention.

With an eccentric encoder, the speed counts T1, T2, and T3 (generated as shown in FIG. 3 from pulse trains 24a, 24b, and 24c, respectively) appear to get shorter and longer through each revolution of the encoder disc 22. FIG. 5 shows the relationship of speed counts T1 and T3 over an entire revolution of the encoder disc 22 rotating at a constant velocity. The speed counts T1, T3 (T2 as well, though not shown in FIG. 5) are sinusoidal, and have the same DC offset, frequency, and amplitude, but differ in phase due to the difference in sensor position about the encoder disc 22. Speed counts T1 and T3 may correspond to encoder sensors 23a and 23c, which are disposed approximately 180 motor shaft degrees apart from each other. Thus, the speed count signals T1 and T3 shown in FIG. 5 are 180 degrees out of phase with respect to each other. In other words, when encoder sensor 23a senses longer periods (higher T1, slower speed), encoder sensor 23c senses shorter periods (lower T3, faster speed). Motor controller 12 may compensate for these differences by averaging the two speed counts T1, T3 to generate a corrected speed count TC. With regards to FIG. 2, the corrected speed count TC may be transmitted as a speed count signal 36 to speed controller 40 to control the speed of motor 20.

Figure 6:
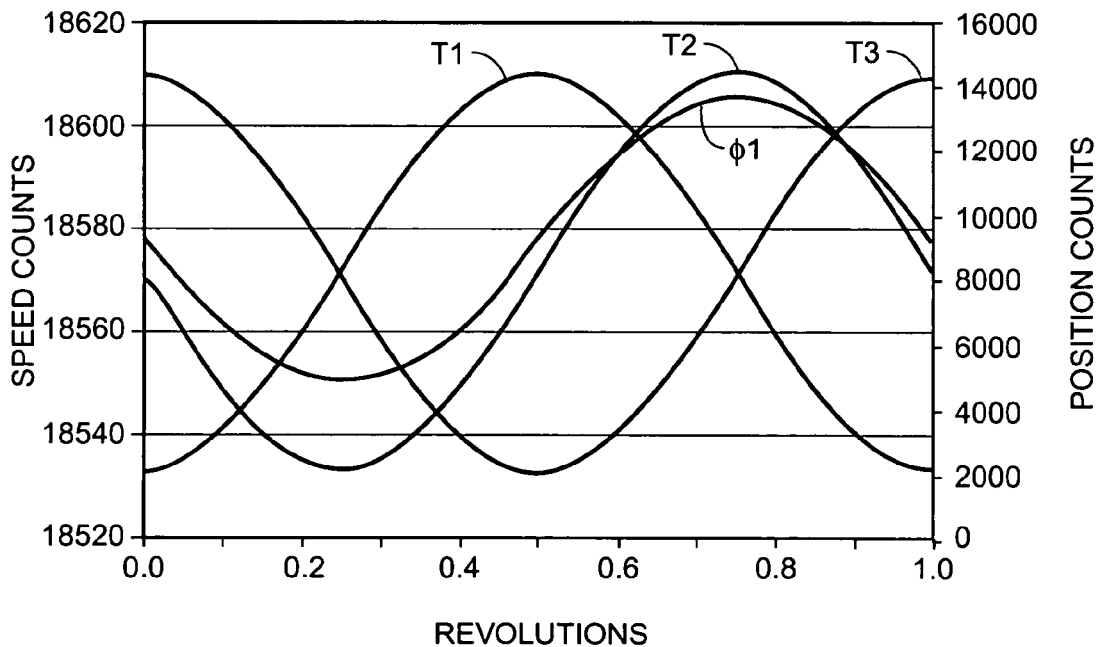
FIG. 6 is a signal plot diagram showing the phase relation between multiple speed counts and a position count for an eccentric encoder according to one embodiment of the present invention.

As is the case with speed counts, the position counts $\Phi 1$, $\Phi 2$, $\Phi 3$ shown in FIG. 4 are also adversely affected by motor eccentricity. In fact, the position counts $\Phi 1$, $\Phi 2$, $\Phi 3$ undergo the same cyclical rising and falling that may be incorrectly interpreted by position controller 38 as apparent position changes. FIG. 6 shows a curve of position count $\Phi 1$ overlaid on the same graphical plot as speed counts T1, T2, and T3 over an entire revolution of the encoder disc 22 rotating at a constant velocity. Position count $\Phi 1$ and speed count T1 may be determined from pulse train 24a generated by encoder sensor 23a (see FIG. 2). Speed counts T2 and T3 may be determined from pulse trains 24b, 24c generated by encoder sensors 23b, 23c, respectively.

The vertical axis on the left side of FIG. 6 represents speed count values while the vertical axis on the right side of FIG. 6 represents position count values. The position count $\Phi 1$ signal has the same frequency as the speed count signals T1, T2, and T3. This is to be expected since the frequency is a function of motor speed and each encoder 23a, 23b, and 23c experiences the same eccentricity effects, albeit at different times. Note that the amplitude of these signals is a function of the encoder eccentricity. The position count $\Phi 1$ has a value (DC offset) that is smaller than speed count T1. This is because the position count $\Phi 1$ represents a timer count taken between a command pulse 33 (that fires somewhere within one pulse train 24a period) and the next rising edge of the pulse train 24a. At the upper limit, a command pulse 33 may coincide with a rising edge of the pulse train 24a, at which point the position count $\Phi 1$ and the speed count T1 will substantially match. However, the position count $\Phi 1$ will generally have some value that is less than or equal to the speed count T1 since some portion of one period of the pulse train 24a is counted. In fact, it is generally desirable for the command pulse 33 to fire approximately halfway through one full pulse train 24a period so that $\Phi 1$ is approximately half of T1. This provides a maximum operating window for the position controller. The procedure for getting the command pulses 33 to fire at or near half the pulse train 24a period is described in greater detail below.

The corrected speed count TC discussed above was determined as an instantaneous average of the most recent values for the speed counts T1 and T3 derived from the two pulse trains 24a, 24c from encoders 23a, 23c, respectively. The same averaging solution is not practically feasible to correct eccentricity for position counts $\Phi 1$, $\Phi 2$, $\Phi 3$, particularly where only one command signal 31 is used. This averaging solution is not ideal because the command signal 31 is associated with one pulse train, for example 24a, and therefore the position counts $\Phi 2$, $\Phi 3$ generated from the other two pulse trains 24b, 24c are not entirely reliable. In the embodiment shown in FIG. 4, the timing of the command pulses 33 is established relative to the pulse train 24a. It was mentioned above that it is desirable for the command pulses 33 to fire approximately halfway through one period of the pulse train 24a. This can be established once a motor is rotating at a constant, steady-state speed. An interrupt is generated within the motor controller 12 to initialize all system variables and position counts $\Phi 1$, $\Phi 2$, $\Phi 3$ and load an initialization count equal to half the desired period (indicated by ½TCMD) into the position counter 30. This initialization count may be based on T1, TC, or preferably, half the desired period based on a desired motor speed. Then, at the next rising edge (indicated by start pulse 48 in command signal 31) of pulse train 24a, the position counter 30 counts down from or up to the initialization count. Once half the desired initialization count ½TCMD elapses, the position counter 30 begins generating the periodic pulses 33, each separated in time by a full command period TCMD, the value of which may be based on a predetermined value based on desired motor speed. Note that, if the encoder pulse trains 24a, 24b, 24c have a 50% duty cycle (i.e., they are at binary 1 for half a period and binary 0 for half a period), the command pulses 33 may simply be started, at least for initialization purposes, on a falling edge of the corresponding pulse train 24a, 24b, 24c without having to implement the half-period counting initialization procedure.

The position counts $\Phi 2$, $\Phi 3$ generated from pulse trains 24b and 24c are not completely reliable for at least two reasons. First, the circumferential position of the encoders 23b, 23c may induce errors in the position counts $\Phi 2$, $\Phi 3$ that are not wholly attributable to eccentricity or motor shaft position changes. The mounting position of the encoders 23b, 23c relative to the encoder segments and relative to encoder 23a affect the phase of the pulse trains 24b, 24c, respectively. Thus, as shown in FIG. 4, the values for the position counts $\Phi 1$, $\Phi 2$, and $\Phi 3$ may be widely different such that averaging these position counts $\Phi 1$, $\Phi 2$, $\Phi 3$ will generally not produce a truly corrected result.

Second, it may also be the case that encoder eccentricity will cause the rising edge of pulse trains 24b, 24c to toggle between leading and lagging the command pulses 33. For instance, FIG. 4 shows a relatively large position count $\Phi 2$, measured between a command pulse 33 and rising edge 50 in pulse train 24b. However, encoder eccentricity may cause the pulse train 24b periods to increase, thereby causing rising edge 52 to shift to the right (lagging) of the command pulse 33. Consequently, the position count $\Phi 2$ would suddenly jump from a large value to a small value. In fact, the position count $\Phi 2$ would jump back and forth once per motor revolution. The same situation may occur with position count $\Phi 3$, where rising edge 54 moves to the left (leading) of the command pulse 33. Consequently, the position count $\Phi 3$ would suddenly jump from a small value to a large value.

Therefore, two approaches are provided herein for establishing a corrected position count that minimizes or eliminates errors caused by an eccentric encoder. The approaches disclosed herein have been shown to provide corrected values for speed and position counts that approach the accuracy of inductive frequency generators. In a first approach, an instantaneous position count error ΦError may be derived from a speed count error TError using the following equation:

$$\frac{\Phi Error}{TError} = \frac{N}{2\pi}\left[1 - \left(\frac{e}{r}\right)^2\right] \quad \text{(Eq. 1)}$$

where N is the number of encoder segments 46 per motor shaft revolution, e is the encoder eccentricity, and r is the optical radius (see FIG. 2). Equation 1 allows one to determine an instantaneous position count error ΦError if the period error TError is known. As discussed above, a corrected speed count TC can be determined by averaging speed counts T1, T3 derived from encoders 23a, 23c that are positioned at substantially opposite sides of the encoder wheel 22. Thus, at any given moment, the period error TError between the corrected speed count TC and any one of the individual speed counts T1, T2, T3 is known. For example, the instantaneous period error TError between the corrected speed count TC and speed count T2 is given by:

$$TError = T2 - TC \quad \text{(Eq. 2)}$$

As a practical matter, the values for N and r in Equation 1 are known quantities based on the specifications of the encoder wheel 22. However, the eccentricity e is an unknown quantity that is corrected by the embodiments disclosed herein. In general, the eccentricity e is small in relation to the radius r. Thus, an approximation of Equation 1 is provided by $$\frac{\Phi Error}{TError} = \frac{N}{2\pi} \quad \text{(Eq. 3)}$$

Equations 1 and 3 are expressed as an error ratio between position and period. Thus, Equations 1 and 3 may be applied to a speed count signal T1, T2, T3 and a position count signal Φ1, Φ2, Φ3 that are phase aligned. The speed count T1 and position count Φ1 may be phase aligned. However, a more general application of the present embodiment is better illustrated using the exemplary count signals shown in FIG. 6, where speed count T1 and position count Φ1 are not phase aligned. This phase misalignment may occur because of a phase delay induced by certain counting devices, such as integrators. Those skilled in the art comprehend that integrators induce a 90 degree phase delay, which may cause the position count Φ1 to lag the speed count T1, even though both are derived from the same encoder. Other phase shifts may occur depending on the components used in a particular application. The present embodiment illustrates a technique to accounting for these phase shifts.

FIG. 6 shows that the exemplary position count curve Φ1 is phase aligned with speed count T2, which is derived from pulse train 24b generated by encoder sensor 23b. Thus, speed count T2 may be used as a reference speed count to determine the position error ΦError and the corrected position count ΦC. Accordingly, in the present embodiment (illustrated in FIG. 2), the encoder 21 uses three encoder sensors 23a, 23b, 23c disposed approximately 90 motor shaft degrees apart from one another. In other words, angle α and angle β are each approximately 90 degrees. Encoder sensors 23a and 23c are used as described above to generate a corrected speed count TC and encoder sensor 23b may be used to calculate a corrected position count ΦC using Equation 1 or Equation 3.

Figure 7:
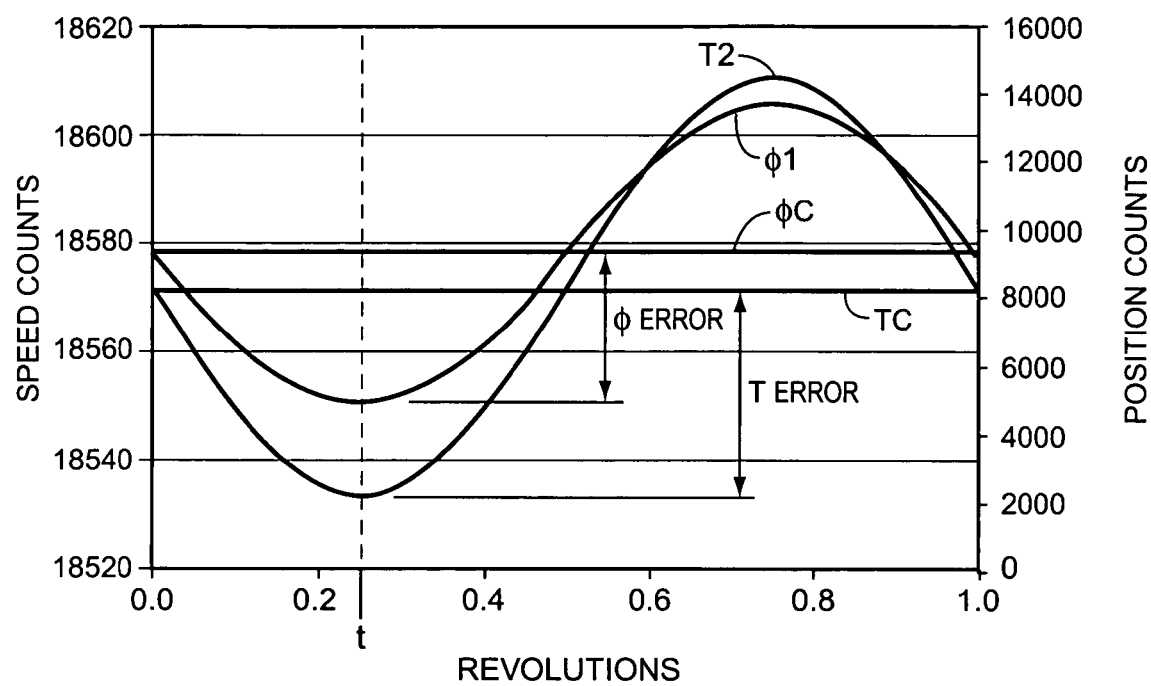
FIG. 7 is a signal plot diagram showing a speed count, a position count, and a corrected position count for an eccentric encoder according to one embodiment of the present invention.

The values used to calculate the corrected position count ΦC are shown more clearly in FIG. 7. The horizontal and vertical axes shown in FIG. 7 are the same as shown in FIG. 6. Thus, the left vertical axis represents speed count values, the right vertical axis represents position count values, and the horizontal axis represents a complete motor shaft (and encoder wheel 22) revolution. As shown in FIG. 7 and in Equation 2 above, TError is expressed as the instantaneous (e.g., at arbitrary time t) difference between the speed count T2 and the corrected speed count TC. Further, the corrected speed count TC is derived from the average of speed counts T1 and T3 as discussed above. Similarly, ΦError is the instantaneous (also at arbitrary time t) difference between the position count Φ1 and the sought-after corrected position count ΦC. Therefore, Equation 3 may be rewritten as:

$$\frac{\Phi 1 - \Phi C}{T2 - \frac{T1+T3}{2}} = \frac{N}{2\pi} \quad \text{(Eq. 4)}$$

Solving Equation 4 for ΦC yields:

$$\Phi C = \Phi 1 - \frac{N}{2\pi} \times \left(T2 - \frac{T1+T3}{2}\right) \quad \text{(Eq. 5)}$$

which may be used by position counter 30 to continually determine a corrected position count value ΦC. Referring to FIG. 1, this position count value ΦC may be transmitted to position controller 38 to effect position control of the motor 20. Since the position counter 30 in the present embodiment uses speed counts T1, T2, and T3 to calculate the corrected position count ΦC, these counts may be provided by the speed counter 34 along signal path 56. Alternatively, the position counter 30 may independently count these values. Alternatively, the speed counter 34 and the position counter 30 may be implemented as a single counter capable of forwarding the appropriate corrected speed count TC and position count ΦC to the speed controller 40 and position controller 38, respectively.

Figure 8:
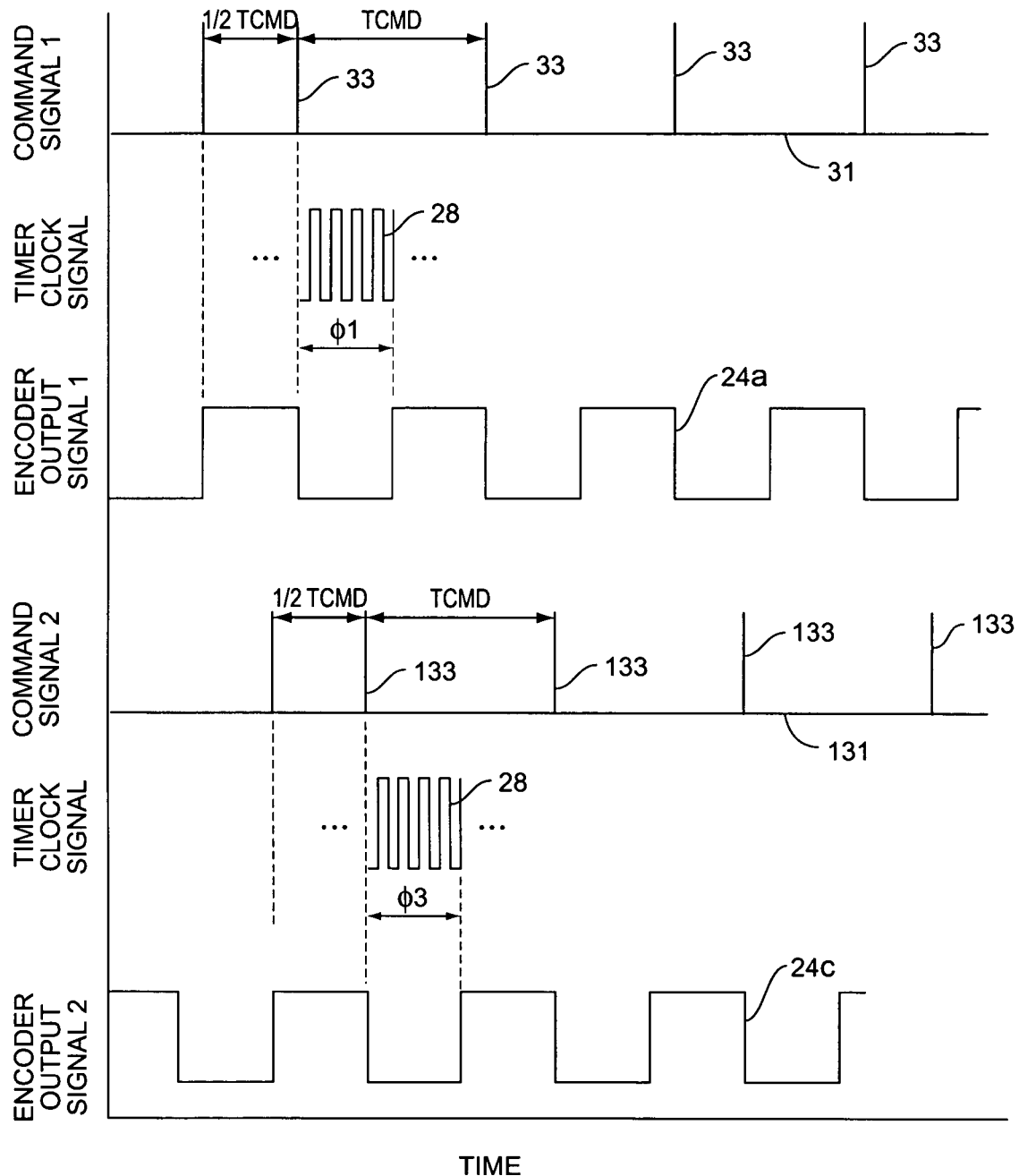
FIG. 8 is a timing diagram showing multiple encoder pulse trains and multiple command signals according to one embodiment of the present invention.

A second approach to determining a corrected position count value ΦC is similar to the averaging solution described above for calculating a corrected speed count TC. This particular approach uses a second command signal 131 as shown in FIG. 8. In this particular embodiment, the same two encoder sensors 23a, 23c used to determine the corrected speed count TC may be used to determine the corrected position count ΦC. Alternatively, two different encoder sensors may be used, resulting in a total of four encoder sensors disposed about the encoder wheel 22 (two for position, two for speed).

A technique for setting the periodic command pulses 33 at or near the midpoint of a pulse train period was disclosed above. This same technique may be applied to the second command signal 131 to set the periodic command pulses 133 at or near the midpoint of a period of pulse train 24c. Then, at any given point in time, the corrected position count ΦC may be calculated from the average of the position counts Φ1, Φ3 shown in FIG. 8.

Where encoder eccentricity is minimal, the two command signals 31, 131 may be started at practically any time without any adverse effects. However, as eccentricity increases, the timing and method with which the command signals 31,131 are started may effect the range of eccentricities that may be corrected using this approach. To highlight these considerations, two different starting strategies are discussed below. In one embodiment, the command signals 31, 131 are started at different times, with the second command signal 131 started after the first signal is locked to encoder sensor 23a. In another embodiment, the command signals 31,131 are started at substantially the same time. In both cases, no additional logic or processing is used to control the timing of the command signals 31, 131, though some control may in fact be used. Thus, the following examples are intended to represent worst case scenarios.

In a first initialization strategy, the position controller 38 is initially locked to sensor pulse trains 24a. That is, the command pulses 33 are set to fire approximately halfway through each period of pulse train 24a. The motor controller 12 controls the position variation of sensor 23a to zero as represented by error curve 58 in FIG. 9a, which shows the uncorrected absolute position variation due to eccentricity for both encoder sensors 23a, 23c. Since error curve 58 is maintained at or near zero, the error curve 60 of sensor 23c shows twice the amplitude of the true encoder eccentricity. Thus, the uncorrected sensor 23c variation varies between −50% to +50% of one complete period due to an encoder eccentricity of 25% for this particular example.

Figure 9A:
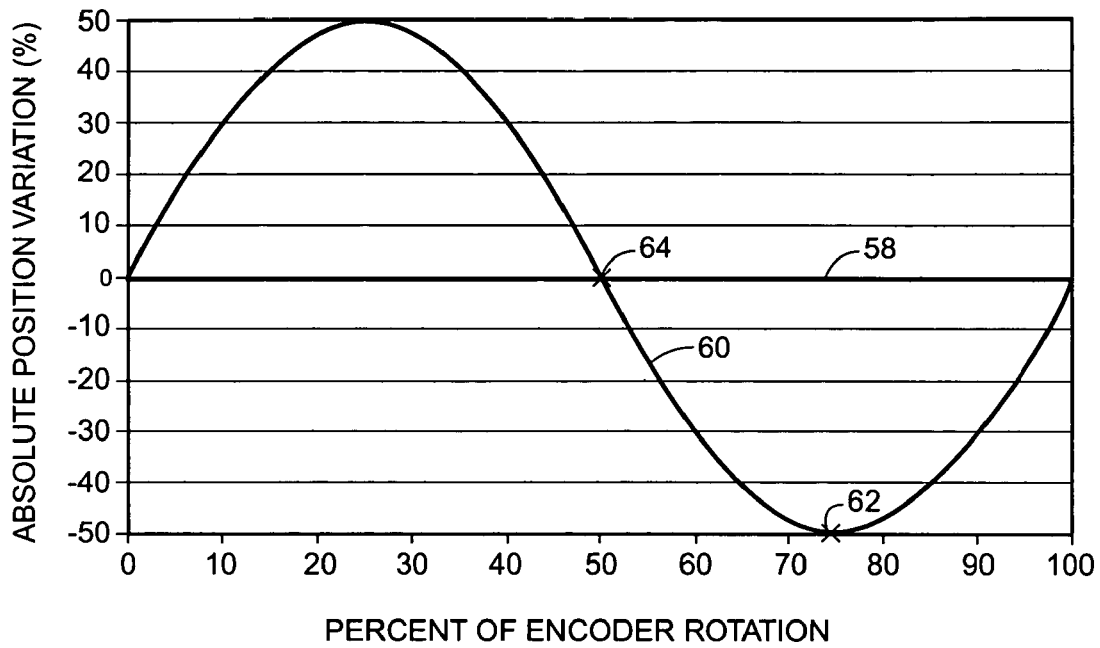
FIGS. 9A and 9B are signal plot diagrams respectively showing uncorrected and corrected position variation for an eccentric encoder according to one embodiment of the present invention.
Figure 9B:
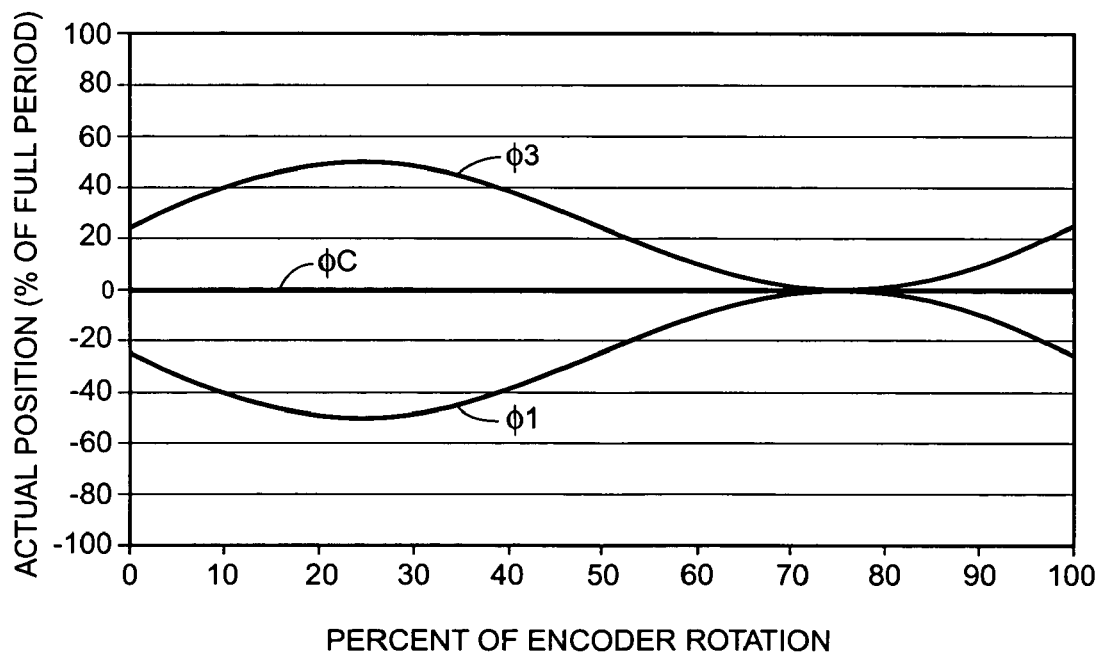

In the present example, the second command signal 131 is started at about the 75% point on the horizontal axis of FIG. 9a, or when the position variation error curve 60 is at its largest negative value (point 62). Initially, the position count Φ3 relative to the second set of command pulses 133 varies between 0% and 100% and the DC value would be 50%. Once the controller 12 reaches a steady state condition, the amplitudes of the two individual position counts Φ1, Φ3 become equal at 25% and the DC value of each individual position counts Φ1, Φ3 shifts by 25% so that the corrected position measurement has an average value of 0%. Thus, in FIG. 9b, position count Φ1 has settled to a DC value of −25% while Φ3 has settled to a DC value of +25%. The average of these two position counts Φ1, Φ3 is shown as the corrected position count ΦC.

In the present example, an encoder eccentricity of 25% temporarily resulted in a position count Φ3 variation that fluctuated between 0% and 100%. Thus, a 25% eccentricity represents an upper limit on the amount of eccentricity that may be corrected using this particular initialization strategy. A larger eccentricity will produce larger position count Φ3 variations that will manifest themselves as transitions between leading and lagging rising edges of pulse train 24c relative to the command pulses 133. As discussed above, these transitions may lead to an unstable motor control 12 loop. Of course, if the second command signal 131 were started at the midpoint (point 64) of the absolute position error signal 60 shown in FIG. 9a, then the final individual position counts Φ1, Φ3 would both vary about zero and no DC offset would be present. Logic or processor instructions may be used to control the precise initialization of the command signal 131. In the absence of this type of control, the worst case scenario shown in FIGS. 9a and 9b must be accounted for.

Figure 10A:
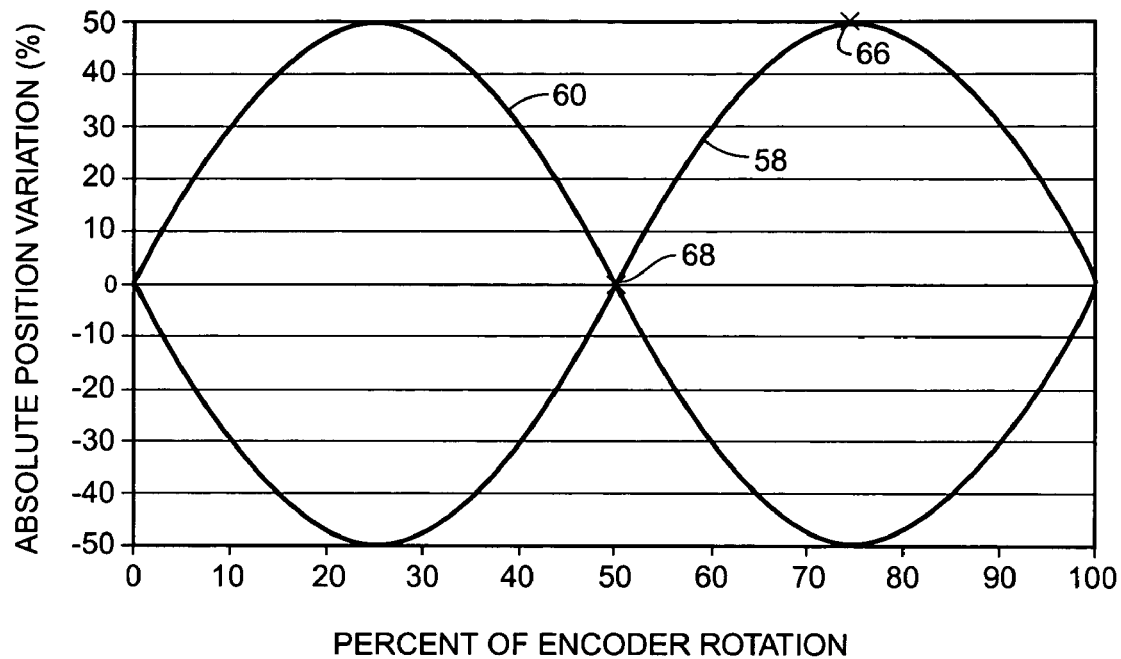
FIGS. 10A and 10B are signal plot diagrams respectively showing uncorrected and corrected position variation for an eccentric encoder according to one embodiment of the present invention.
Figure 10B:
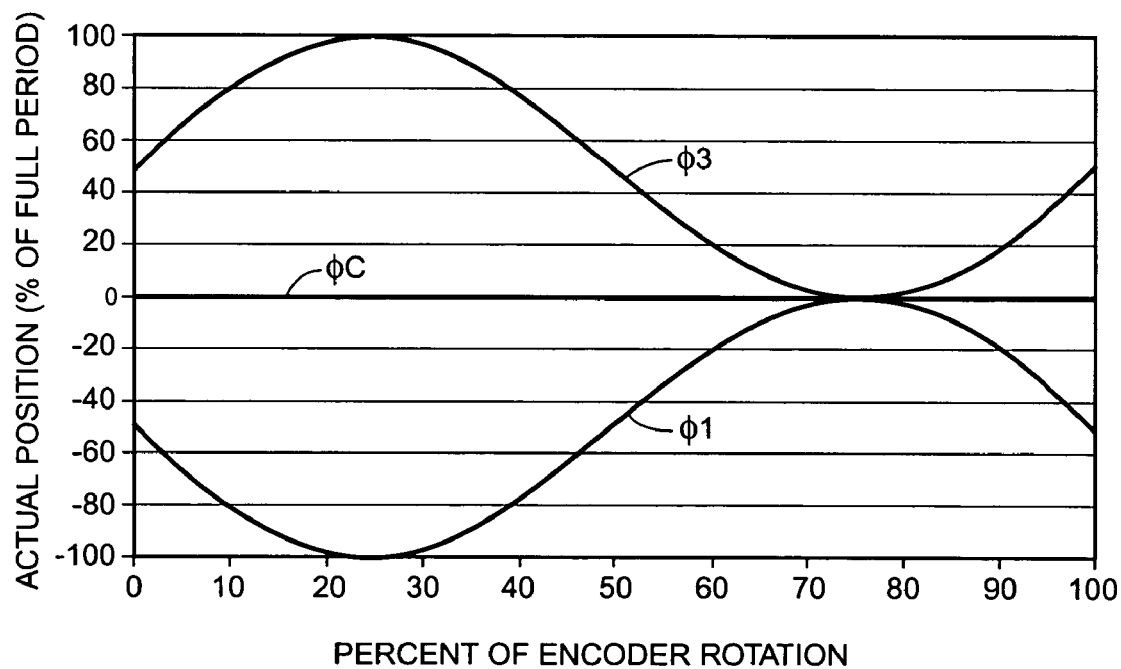

In a second initialization strategy, the position controller 38 is not locked onto either pulse train 24a, 24c. In this particular case, both command signals 31, 131 are started at approximately the same time and both are used to correct encoder eccentricity. FIG. 10a shows this particular scenario with an encoder 21 having an eccentricity of 50% of one total period. That is, the eccentricity for the encoder 21 in FIGS. 10a, 10b is twice that of the encoder 21 in FIGS. 9a, 9b. With neither position count Φ1, Φ3 corrected, the absolute uncorrected position variation 60, 62 due to encoder eccentricity is the same amplitude for each sensor 23a, 23c and 180 electrical degrees out of phase.

In the present example, the command signals 31,131 are started at about the 75% point on the horizontal axis of FIG. 10a, or when the position variation error curve 62 is at its largest positive value (point 66). Initially, the position count Φ1 relative to the first set of command pulses 33 varies between 0% and −100% and the DC value would be −50%. Also, the initial position count Φ3 relative to the second set of command pulses 133 varies between 0% and 100% with a DC value of 50%. Once the controller 12 reaches a steady state condition, the amplitudes of the two individual position counts Φ1, Φ3 become equal at 50%, but the initial DC value of each individual position count Φ1, Φ3 remains so that the corrected position measurement has an average value of 0%. Thus, in FIG. 10b, position count Φ1 remains at a DC value of −50% while Φ3 remains at a DC value of +50%. The average of these two position counts Φ1, Φ3 is shown as the corrected position count ΦC. As with the previous initialization strategy, the DC offsets may be minimized if the command signals 31, 131 are started closer to the zero-axis crossing (point 68).

In the present example, an encoder eccentricity of 50% temporarily resulted in position count Φ1, Φ3 variations that fluctuated between 0% and 100%. Thus, a 50% eccentricity represents an upper limit on the amount of eccentricity that may be corrected using this particular initialization strategy. As before, logic or processor instructions may be used to control the precise initialization of the command signals 31, 131. In the absence of this type of control, the worst case scenario shown in FIGS. 10a and 10b must be accounted for.

The present invention may be carried out in other specific ways than those herein set forth without departing from the scope and essential characteristics of the invention. For instance, the signals represented by Φ1 and T2 in Equation 5 may be changed as necessary to other count signals that are in phase alignment with one another. Thus, application of the encoder correction technique provided by Equation 5 is not expressly limited to encoders sensors 23a, 23b that are 90 shaft degrees apart. Encoder sensors at any angle may be used provided the speed and position count signals are in phase. Furthermore, where the corrected position ΦC is calculated using Equation 5, the $N/2\pi$ term in that equation may be rounded to the nearest power of 2 so the calculation may be performed using a bit-shift operation in an ASIC or other computer processor. The present embodiments are, therefore, to be considered in all respects as illustrative and not restrictive, and all changes coming within the meaning and equivalency range of the appended claims are intended to be embraced therein.

What is claimed is:

1. A method of correcting encoder eccentricity in an image forming device that uses encoder feedback signals to generate speed and position counts to control the speed and position of a rotary encoder, the method comprising:

receiving a plurality of pulse trains indicative of the speed of the rotary encoder;

receiving a clocking signal having a frequency greater than the pulse trains;

generating a series of periodic sampling points;

calculating a corrected position count based at least partly on a first position count that is determined by counting a number of cycles of the clocking signal that elapse between a sampling point and a transition of a first of the plurality of pulse trains and a second position count based upon a second of the plurality of pulse trains; and adjusting the speed of the rotary encoder and maintaining a substantially constant value tor the corrected position count to effect position control.

2. The method of claim 1 further comprising:

calculating a corrected speed count by averaging a first speed count and a second speed count, the first speed count and the second speed count determined by counting a number of cycles of the clocking signal that elapse per cycle of pulse trains received from rotary encoder sensors that are disposed about an encoder disc, substantially 180 rotary degrees apart from one another, respectively; and adjusting the speed of the rotary encoder and maintaining a substantially constant value for the corrected speed count to effect speed control.

3. The method of claim 2 further comprising operatively coupling the encoder disc to a motor, the steps of adjusting the speed of the rotary encoder comprising adjusting the speed of the motor.

4. The method of claim 2 wherein calculating the corrected position count is based at least partly upon a ratio of a position count error and speed count error, the position count error being relative to the first position count and the speed count error being relative to the corrected speed count.

5. The method of claim 1 wherein the step of generating a corrected position count comprises generating a second series of periodic sampling points and averaging the first position count and the second position count that is determined by counting a number of cycles of the clocking signal that elapse between a second sampling point and a transition of the second of the plurality of pulse trains.

6. The method of claim 5 wherein the first and second pulse trains are generated by rotary encoder sensors disposed substantially 180 rotary degrees apart from one another.

7. The method of claim 5 wherein the steps of generating a series of periodic sampling points and generating a second series of periodic sampling points are initiated at approximately the same time.

8. The method of claim 5 wherein the steps of generating a series of periodic sampling points and generating a second series of periodic sampling points are initiated at different times.

9. The method of claim 1 wherein calculating the corrected position count is further based on a first speed count, a second speed count, and a third speed count, the first speed count, the second speed count, and the third speed count determined by counting a number of cycles of the clocking signal that elapse per cycle of pulse trains received from a first, a second, and a third rotary encoder sensor, respectively, each encoder disposed about a rotary encoder disc.

10. The method of claim 9 wherein the first rotary encoder sensor and the second rotary encoder sensor are disposed substantially 180 rotary degrees apart from one another and the third rotary encoder sensor is disposed to lag the first rotary encoder sensor by substantially 90 rotary degrees.

11. The method of claim 9 wherein the corrected position count is calculated from the equation:

$$\Phi_{corrected} = \Phi 1 - N/2\pi \times [T3 - T1 + T2/2]$$

where $\Phi_{corrected}$ is the corrected position count $\Phi 1$ is the first position count, N is the number of encoder pulses per encoder disc revolution, and T1, T2, and T3 are the first speed count, the second speed count, and the third speed count, respectively.

12. A method of correcting encoder eccentricity in an image forming device that uses feedback signals from a rotary encoder to control speed and position of the rotary encoder, the method comprising:

positioning a first encoder sensor and a second encoder sensor at different positions about an encoder wheel;

determining a first speed count and a second speed count by counting a number of clock cycles that elapse per cycle of a pulse train received from the first encoder sensor and the second encoder sensor, respectively;

determining a first position count by counting a number of clock cycles that elapse between a periodic command pulse and a transition of the pulse train received from the first encoder sensor;

calculating a corrected speed count based upon an average of the first speed count and the second speed count;

calculating a corrected position count based at least partly on the first position count; and maintaining a substantially constant value for the corrected speed count and for the corrected position count by adjusting the speed of the rotary encoder to effect speed and position control of the encoder wheel.

13. The method of claim 12 further comprising determining a second position count by counting a number of clock cycles that elapse between a second periodic command pulse and a transition of the pulse train received from the second encoder sensor, the step of calculating a corrected position count comprising averaging the first and second position counts.

14. The method of claim 13 wherein the first and second pulse trains are generated by rotary encoder sensors disposed substantially 180 encoder wheel degrees apart from one another.

15. The method of claim 13 wherein the steps of generating a periodic command pulse and generating a second periodic command pulse are initiated at approximately the same time.

16. The method of claim 13 wherein the steps of generating a periodic command pulse and generating a second periodic command pulse are initiated at different times.

17. The method of claim 12 wherein calculating a corrected position count comprises predicting a position count error from a correlated speed count error, the position count error being defined as the difference between the first position count and the corrected position count, the speed count error being defined as the difference between a reference speed count and the corrected speed count, the reference speed count determined by counting a number of clock cycles that elapse per cycle of a pulse train received from a reference encoder sensor, the reference speed count having the same phase as the first position count.

18. The method claim 17 wherein calculating the corrected position count comprises evaluating the expression:

$$\Phi 1 - \text{Error\_Ratio} \times [T3 - TC]$$

where $\Phi 1$ is the first position count, Error—Ratio is a ratio of the position count error and the speed count error, TC is the corrected speed count and T3 is the reference speed count.

19. The method of claim 17 further comprising positioning the reference encoder sensor at a position about the encoder wheel that lags the first encoder sensor by substantially 90 encoder wheel degrees.

20. The method of claim 12 further comprising operatively coupling the encoder wheel to a motion inducing actuator, the step of adjusting the speed of the rotary encoder comprising adjusting the speed of the motion inducing actuator.

21. The method of claim 12 wherein the motion inducing actuator is a rotary motor.

22. A method of correcting encoder eccentricity in an image forming device that uses encoder feedback signals to generate speed and position counts to control the speed and position of a rotary encoder, the method comprising:
- receiving a plurality of pulse trains indicative of the speed of the rotary encoder;
- receiving a clocking signal having a frequency greater than the pulse trains;
- generating a series of periodic sampling points;
- calculating a corrected speed count by averaging a first speed count and a second speed count, the first speed count and the second speed count determined by counting a number of cycles of the clocking signal that elapse per cycle of pulse trains received from rotary encoder sensors that are disposed about an encoder disc, substantially 180 rotary degrees apart from one another, respectively; and
- adjusting the speed of the rotary encoder and maintaining a substantially constant value for the corrected speed count to effect speed control.

23. The method of claim 22 further comprising:
- calculating a corrected position count based at least partly on a first position count that is determined by counting a number of cycles of the clocking signal that elapse between a sampling point and a transition of one of the plurality of pulse trains; and
- adjusting the speed of the rotary encoder and maintaining a substantially constant value for the corrected position count to effect position control.

24. The method of claim 23 wherein calculating the corrected position count is based at least partly upon a ratio of a position count error and speed count error, the position count error being relative to the first position count and the speed count error being relative to the corrected speed count.

25. The method of claim 23 wherein the step of generating a corrected position count comprises generating a second series of periodic sampling points and averaging the first position count and a second position count that is determined by counting a number of cycles of the clocking signal that elapse between a second sampling point and a transition of a second of one of the plurality of pulse trains.

26. The method of claim 23 wherein calculating the corrected position count is further based on a first speed count, a second speed count, and a third speed count, the first speed count, the second speed count, and the third speed count determined by counting a number of cycles of the clocking signal that elapse per cycle of pulse trains received from a first, a second, and a third rotary encoder sensor, respectively, each encoder disposed about a rotary encoder disc.

27. The method of claim 26 wherein the corrected position count is calculated from the equation:

$$\Phi_{corrected} = \Phi1 - N/2\pi \times [T3 - T1 + T2/2]$$

where $\Phi_{corrected}$ is the corrected position count $\Phi1$ is the first position count, N is the number of encoder pulses per encoder disc revolution, and T1, T2, and T3 are the first speed count, the second speed count, and the third speed count, respectively.

* * * * *

UNITED STATES PATENT AND TRADEMARK OFFICE
CERTIFICATE OF CORRECTION

PATENT NO. : 7,633,256 B2 Page 1 of 1
APPLICATION NO. : 11/121576
DATED : December 15, 2009
INVENTOR(S) : Reichert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1208 days.

Signed and Sealed this

Twenty-first Day of December, 2010

David J. Kappos
*Director of the United States Patent and Trademark Office*